(12) United States Patent
de Witzmann et al.

(10) Patent No.: US 6,524,641 B1
(45) Date of Patent: Feb. 25, 2003

(54) METHOD FOR PRODUCING SUBSTRATES HAVING DEFECT FREE PATTERNS THEREON

(75) Inventors: Monica Cotlear de Witzmann, Nieder-Olm (DE); Petra Auchter-Krummel, Vendersheim (DE); Waldemar Weinberg, Kiebitzreihe (DE); Dave Campbell, Vincennes, IN (US)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/735,300

(22) Filed: Mar. 21, 2000

(30) Foreign Application Priority Data

Mar. 22, 1999 (DE) .......................................... 199 12 914

(51) Int. Cl.$^7$ ................................................ B05D 3/06
(52) U.S. Cl. ............................... 427/8; 427/10; 264/406
(58) Field of Search ...................... 427/8, 10; 264/406, 264/430

(56) References Cited

U.S. PATENT DOCUMENTS 4,331,700 A * 5/1982 Schelhorn
4,679,938 A * 7/1987 Flamholz
5,110,835 A   5/1992 Walter et al. ................. 521/57

FOREIGN PATENT DOCUMENTS

| DE | 2841287 | 4/1980 |
|----|---------|--------|
| DE | 3505922 | 10/1986 |
| DE | 4024871 | 2/1992 |
| DE | 4422338 | 1/1996 |
| DE | 19728881 | 9/1998 |
| EP | 0220333 | 5/1987 |

OTHER PUBLICATIONS

Otto–Albrecht Neumüller, *Römpps Chemie–Lexikon*, 1975, W. Keller & Co., Stuttgart, Germany—description of Sudan ®.

* cited by examiner

Primary Examiner—Christopher A. Fiorilla
(74) Attorney, Agent, or Firm—Nils H. Ljungman & Associates

(57) ABSTRACT

A method for producing a fired decoration with an essentially defect-free visual appearance on substrates made of glass, glass-ceramic, ceramic, or other substances with other decorative colors consisting of base enamel, pigments, and additives, whereby as additives, UV-sensitive optical whitening agents, in particular thiophene-benzoxazol derivatives, are added to the decorative color.

18 Claims, No Drawings

METHOD FOR PRODUCING SUBSTRATES HAVING DEFECT FREE PATTERNS THEREON

BACKGROUND OF THE INVENTION

1. Field of the Invention

The present invention may relate to a method for producing a fired decoration with an essentially defect-free visual appearance on substrates made of glass, glass-ceramic, or ceramic with other decorative colors consisting of base enamel, pigments, and additives.

2. Background Information

The substrates used can thereby be soda-lime glasses, borosilicate glasses, glass ceramics, porcelain, earthenware, stoneware, vitreous clay, and all substrates on which a decoration of ceramic colors can be applied, i.e., including the use of paper as a backing for transfer images.

Such a glass ceramic is described, for example, in European Patent No. 0 220 333 B1.

Ceramic colors are used in particular for the decoration in particular of glass and glass ceramics. These colors conventionally consist of one or more vitreous substances (base enamel or vitrified glass paste) and an admixture of one or more pigments (coloring agents).

Ceramic colors are conventionally produced by mixing frits (cracked glass paste) and the inorganic pigments. The mixing can thereby be done as early as during the process of melting the glass paste (fritting) or before or during a subsequent grinding process of the cracked glass paste. The ready-to-use ceramic colors are then available in the form of powder mixtures of pigments and glasses. The pigments, which may consist of metal oxides, are to a certain degree soluble in the molten glass. As a general rule, the solubility of the pigments increases with the temperature of the molten glass.

For decoration, in particular of glass and/or glass ceramic items, which are generally already in their final form, the powdered pigment is applied in a variety of ways to the substrate to be coated. The powder can be on average in particle diameters that range from less than approximately 1 micrometer up to approximately 40 micrometers.

In other words, the powder of the powdered pigment can be on average in particle diameters within a range from less than approximately 1 micron up to approximately 40 microns.

To fix the ceramic colors before firing, they are dispersed in essentially low-viscosity to essentially high-viscosity distribution-promotion agents, which volatilize partly during the drying of the applied colors and partly during the firing process. Examples of this step are the mixing with screen printing oil and the subsequent direct screen printing or indirect printing (e.g., via a transfer image) method, the mixing with thermoplastic material, and the subsequent screen printing with the application of heat.

In at least one possible embodiment of the present invention, screen-printable pastes may be produced using suspending media and solvents, for example, ethylcellulose, and screen-printing media, for example, fir oil-based media. The paste consistency set may determine the layer thickness of the decoration after firing.

To make the items to be decorated usable, the coatings applied to the substrate must be melted by firing them into a solid unit with the substrate. During heating, the glass powder preferably melts and forms a compact layer in which the pigment particles are embedded.

Such glass compounds for glazing, enameling and decoration, in particular of glass or glass ceramic materials, are known, for example, from German Patent No. 42 01 286 C2, German Patent Application No. DE-OS 42 41 411 C2, and German Patent No. 197 21 737 C1.

For the decoration of substrates, in particular of glass and glass ceramic objects, for example, by means of screen printing, the problem of reliably detecting flaws and defects in the decoration is very difficult. The thinner the decorative coating and the finer the pattern, the more difficult it is to see and detect defects before the decorative coating is fired. Consequently, after firing, the items on which the decoration is defective must be discarded, although otherwise they could be easily washed and reprinted before firing, which would significantly increase the yield of the production process.

During the decoration of glass ceramics, very thin, coarse coatings (approximately 8–10 micrometers) result, which have a relatively low contrast with the support e.g., in particular with a glass ceramic as disclosed in European Patent No. 0 220 333 B1.

One solution for this problem that has been used in the past was the addition of organic dyeing agents, which have long been used in the porcelain and ceramics industry, in particular for coloring ceramic compounds, e.g., Sudan®, manufactured by BASF. Such additives are available in red, yellow, and blue colors and have the characteristic that they burn off essentially completely, leaving essentially no residue, at approximately 500 degrees Celsius, so that there are essentially no adverse effects on the finished product.

Some types of decorations, however, have patterns that are so extremely fine and thereby dense (e.g., dot diameter 0.5 millimeters) that the contrast, e.g., by means of dyeing with Sudan®, is not sufficient to make it possible to reliably detect defects in the pattern before the piece is fired.

German Unexamined Patent Application No. DE-OS 44 22 338 A1 discloses hot-melt-type adhesives that contain a detectable content of at least one UV-active substance as a marking material. These UV-active substances are optical whitening agents, in particular thiophene-benzoxazol derivatives. German Patent Application No. DE-OS 40 24 871 A1 discloses styrene polymerizates that have antistatic properties and contain fluorescence coloring agents that are conventionally absorbent in the UV range, such as optical whitening agents of the type Uvitex®OB manufactured by CIBA, i.e., thiophene-benzoxazol derivatives.

German Patent No. 35 05 922 C1 relates to a method for the decoration of glass ceramic plates in which the decorative colors are applied before ceramicization and the ceramicization and the firing of the coloring substances are performed simultaneously.

German Patent No. 197 28 881 C1 describes glass ceramic articles decorated with ceramic colors.

None of the documents cited above discloses the use of a UV-sensitive optical whitening agent as an additive to a decorative color.

OBJECT OF THE INVENTION

One object of the present invention may therefore be the development of a method to produce decorations which are essentially free of optical defects after they have been fired, and with which, even with extremely finely patterned decorations, it is possible to essentially easily and reliably detect variations from the ideal decoration before firing by means of a perceived color that becomes luminescent under UV radiation and which has a high contrast with the substrate.

In other words, in at least one possible embodiment of the present invention, an object of the present invention preferably is a method of producing decorations that, after they have been fired onto a substrate, are essentially free or completely free of defects when viewed with the naked human eye, even when the decorations have an extremely small, delicate, or fine pattern or have extremely small, delicate, or fine patterns. The detection of such defects, in at least one possible embodiment of the present invention, preferably is possible because of the use of a color, pigment, or coloring agent that may be perceived as a color by the naked human eye and that both preferably becomes luminescent under ultraviolet irradiation and preferably contrasts essentially highly with at least one coloring agent in the substrate on which the decoration is fired, or alternatively with at least one coloring agent in the decoration.

Additional objects of the invention may be the essentially complete absence of negative effects on the useful characteristics of the fired or ceramicized substrates as well as the essentially complete absence of toxicologically problematic reaction products or fission products, which objects may be achieved by the method.

SUMMARY OF THE INVENTION

These objects may be achieved by at least one possible object of the present invention, which preferably teaches that UV-sensitive optical whitening agents are added in the form of additives to the decorative color. In particular, thiophene-benzoxazol derivatives and products that contain 2,2'-(2,5-thiophenediyl)-bis(5-(1,1-dimethylethyl)-benzoxalate are added to the decorative color as optical whitening agents. The additives can thereby be added by being mixed into the screen printing oil, for example, or by stirring into the coloring substance that has been processed into a paste form.

At least one possible embodiment of the present invention preferably teaches that the additive is added to and homogeneously mixed with the decorative color in finely divided powder form in quantities of approximately 0.05 to approximately 10 percent by weight, based on the total weight of the composition, in particular in quantities of approximately 0.1 to approximately 1 percent by weight, based on the total weight of the composition.

At least one possible embodiment of the present invention preferably teaches that it is particularly advantageous if the additives have UV-reflecting, fluorescent characteristics. Under UV light, it is often much easier to detect flaws and defects, either with the naked eye or with appropriate measuring instruments, because the contrast with the background may be significantly greater. The range of radiation most suitable for an optimal increase in contrast can thereby be determined as a function of the substrate and the decorative color in question by means of preliminary tests on a case-by-case basis.

At least one possible embodiment of the present invention preferably teaches that decorative colors suitable for screen printing are preferably used in the method, because these colors may meet the highest quality requirements for the configuration and realization of the decorations.

The decorations may be used, for example, for inscriptions, for achieving a desired design, or to support certain technical functions, for example, for display windows or for marking cooking zones.

The glaze, enamel, or decoration may be fired at temperatures below the softening point of the article to be coated, during which the respective glass composition of the glaze or enamel melts and forms a stable bond to the surface of the article. The firing temperatures are generally below the softening point of the article to be coated in order that uncontrolled deformation cannot occur. The firing also serves to volatize organic auxiliaries used, for example, as suspension media for applications of the glaze, enamel, or decoration.

The above-discussed embodiments of the present invention will be described further hereinbelow. When the word "invention" is used in this specification, the word "invention" includes "inventions", that is, the plural of "invention". By stating "invention", Applicants do not in any way admit that the present application does not include more than one patentably and non-obviously distinct invention, and maintain that this application may include more than one patentably and non-obviously distinct invention. Applicants hereby assert that the disclosure of this application may include more than one invention, and, in the event that there is more than one invention, that these inventions may be patentable and non-obvious one with respect to the other.

DESCRIPTION OF THE PREFERRED EMBODIMENT

The exemplary embodiment described below is intended to explain the method, according to at least one possible embodiment of the present invention, in greater detail.

To a glass compound with, in percent by weight, based on the total weight of the glass compound, 54.0 $SiO_2$, 17.5 $A_2O_3$, 17.5 $B_2O_3$, 3.1 $Li_2O$, 1.9 $TiO_2$, 1.2 ZrO, 1.2 $ZrO_2$, 1 $Na_2O$, 1 $K_2O$, 1 SrO, 0.4 MgO and a pigment addition of approximately 20 percent by weight, based on the total weight of the glass compound, which has been ground by wet grinding, preferably to grain sizes of less than approximately 10 micrometers, preferably approximately 1 micrometer to approximately 3 micrometers, and mixed into a paste with a standard screen printing oil, with the additive being, in approximately 0.5 percent by weight, based on the total weight of the composition, Uvitex®OB, manufactured by CIBA Spezialitätenchemie GmbH, Lampertheim, Federal Republic of Germany, is added in finely divided form and stirred for approximately 10 minutes to achieve a homogeneous mixture.

The decorative color prepared in this manner was then applied in a conventional manner using a screen printing process to a glass plate that had not yet been ceramicized, and the decorative color is then dried.

In spite of a very dense decorative pattern that contained a great deal of filigree, during the quality control inspection of the decoration before ceramicizing, under UV or ultraviolet light, it was essentially easily possible to identify even very tiny variations from the ideal or desired decoration and to visually identify every defect in the decoration.

When a decoration defect is detected before the plate has been fired, the decoration can essentially easily be removed from the plate by washing, and the plate can be redecorated.

In production tests under conditions.very close to those of an actual production process and with particularly difficult decorative patterns, e.g., very small, uniform dot patterns on large surfaces, the method was able to reduce the number of decorated and ceramicized plates that would previously have had to be rejected by up to 90 percent.

The additives used according to at least one possible embodiment of the present invention, including Uvitex®OB manufactured by CIBA Spezialitäiten GmbH, are normally used as optical whitening agents in polymers.

The ceramic colors that were mixed as taught by at least one possible embodiment of the present invention were used in particular in the decoration of glass ceramics, and the finished product was then tested for its useful properties on the basis of conventional test specifications with positive results.

Tests were also conducted with regard to the combustion and cracking products to ensure that the concentrations of additives in the mixture of color and screen printing oil do not have any toxicological significance.

When the substances are used in a conventional manner as optical whitening agents in polymers, they may not be exposed to any elevated temperatures. In ceramic colors, on the other hand, the optical whitening agent may first be used for purposes of defect detection and may then be burned off, leaving essentially no residue.

In at least one possible embodiment of the present invention, the amount of residue left on the substrate after the pattern or decoration is fired on the substrate may be measured by at least one of the following methods: mass spectrometry, proton microscopy, and electron microscopy.

In at least one possible embodiment of the present invention, the mixture to be applied to the substrate may possibly consist of a glass frit without the addition of a pigment.

One feature of the invention resides broadly in a method for producing substrates having fired patterns thereon having an essentially defect-free visual appearance, which substrates comprise glass, glass-ceramic, or ceramic, said method comprising the steps of: mixing components to form a mixture for at least one pattern to be fired on said substrates; said components comprising at least one vitreous substance, at least one pigment, and at least one contrasting agent; said at least one pigment comprising at least one metal oxide; said at least one contrasting agent in said mixture being capable of emitting radiation upon exposure to a predetermined range of irradiation comprising ultraviolet irradiation; applying said at least one pattern to said substrates with said mixture to provide said at least one pattern with at least one background; said mixture comprising sufficient amounts of said at least one contrasting agent to provide a sufficiently high contrast with said at least one background to permit detection of predetermined defects in said at least one pattern after said step of applying and before firing said at least one applied pattern; irradiating said substrates and their at least one applied pattern, after said step of applying, with radiation in said predetermined range of irradiation; at least one of said substrates comprising at least one defective pattern, said defective pattern having predetermined defects; detecting said predetermined defects in said at least one defective pattern against said at least one background upon said step of irradiating; at least one of said substrates comprising at least one non-defective pattern, said at least one non-defective pattern being free from said predetermined defects; rejecting said at least one defective pattern and passing said at least one non-defective pattern; and firing said at least one non-defective pattern on said substrates to produce substrates having fired patterns thereon.

Another feature of the invention resides broadly in a method for producing substrates having fired patterns thereon having an essentially defect-free visual appearance, which substrates comprise glass, glass-ceramic, or ceramic, said method comprising the steps of: mixing components to form a mixture for at least one pattern to be fired on said substrates; said components comprising at least one pigment and at least one additive; said at least one additive in said mixture being capable of emitting radiation upon exposure to a predetermined range of irradiation comprising ultraviolet irradiation; applying said at least one pattern to said substrates with said mixture to provide said at least one pattern with at least one background; said mixture comprising sufficient amounts of said at least one additive to provide a sufficiently high contrast with said at least one background to permit detection of predetermined defects in said at least one pattern after said step of applying and before firing said at least one pattern; irradiating said substrates and their at least one pattern, after said step of applying, with radiation in said predetermined range of irradiation; at least one of said substrates comprising at least one defective pattern, said defective pattern having predetermined defects; detecting said predetermined defects in said at least one defective pattern against said at least one background upon said step of irradiating; at least one of said substrates comprising at least one non-defective pattern, said at least one non-defective pattern being free from said predetermined defects; rejecting said at least one defective pattern and passing said at least one non-defective pattern; and firing said at least one non-defective pattern on said substrates to produce substrates having fired patterns thereon.

Yet another feature of the invention resides broadly in a method for producing substrates having fired patterns thereon having an essentially defect-free visual appearance, which substrates comprise glass, glass-ceramic, or ceramic, said method comprising the steps of: forming at least one pattern from a substance to be fired on said substrates; said substance being capable of emitting radiation upon exposure to a predetermined range of irradiation comprising ultraviolet irradiation; applying said at least one pattern with said substance to said substrates to provide said at least one pattern with at least one background; said substance being present in a sufficiently high amount to provide a sufficiently high contrast with said at least one background to permit detection of predetermined defects in said at least one pattern after said step of applying and before firing said at least one applied pattern; irradiating said substrates and their at least one pattern, after said step of applying, with radiation in said predetermined range of irradiation; at least one of said substrates comprising at least one defective pattern, said defective pattern having predetermined defects; detecting said predetermined defects in said at least one defective pattern against said at least one background upon said step of irradiating; at least one of said substrates comprising at least one non-defective pattern, said at least one non-defective pattern being free from said predetermined defects; rejecting said at least one defective pattern and passing said at least one non-defective pattern; and firing said at least one non-defective pattern on said substrates to produce substrates having fired patterns thereon.

Still another feature of the invention resides broadly in a substrate having at least one fired pattern thereon, said substrate being produced by the method.

A further feature of the invention resides broadly in a stove comprising a substrate having at least one fired pattern thereon, said substrate being produced by the method.

One feature of the invention resides broadly in a method for producing a fired decoration with a defect-free visual appearance on substrates made of glass, glass-ceramic or ceramic with other decorative colors consisting of base enamel, pigments and additives, characterized by the fact that as additives, UV-sensitive optical whitening agents are added to the decorative color, which additives, after the decoration has been applied to the substrate of the decorative color, under suitable UV irradiation give a fluorescent perceived color to the substrate with a contrast that is sufficiently high so that defects in the decoration can be detected before firing, even with extremely finely patterned decorations.

Another feature of the invention resides broadly in the method characterized by the fact that thiophene-benzoxazol derivatives are added in the form of additives to the decorative color.

Yet another feature of the invention resides broadly in the method characterized by the fact that as additives, a product that contains 2,2'-(2,5-thiophenediyl)-bis(3-(1,1-dimethylethyl))-benzoxazol is added to the decorative color.

Still another feature of the invention resides broadly in the method characterized by the fact that the additives are added to the decorative color in finely divided form in an amount from 0.05 weight percent to 10 weight percent.

A further feature of the invention resides broadly in the method characterized by the fact that the additives are added to the decorative color in an amount from 0.1 weight percent to 1.0 weight percent.

Another feature of the invention resides broadly in the method characterized by the fact that screen printing colors are used as decorative colors.

In this application, at least one of the terms "pigment", "pigments", "ceramic color", or "ceramic colors" may mean, for example, at least one of the terms "coloring agent", "coloring agents", "coloring substance", and "coloring substances".

In this application, at least one of the terms "pigment", "pigments", "ceramic color", "ceramic colors", "coloring agent", "coloring agents", "coloring substance", "coloring substances", "substance", and "substances" may mean, for example, at least one of a black pigment and a white pigment.

In this application, the term "UV" may refer to ultraviolet radiation.

Some examples of substrates or materials and processes related thereto that may be used or adapted for use in at least one possible embodiment of the present invention may be found in the following U.S. Pat. No. 5,843,853, issued on Dec. 1, 1998; U.S. Pat. No. 5,707,909, issued on Jan. 13, 1998; U.S. Pat. No. 5,633,090, issued on May 27, 1997; U.S. Pat. No. 4,888,314, issued to inventors Bernier et al. on Dec. 19, 1989; U.S. Pat. No. 4,757,037, issued to inventors Colombet et al. on Jul. 12, 1988; U.S. Pat. No. 4,549,484, issued to inventor Neese on Oct. 29, 1985; U.S. Pat. No. 4,537,862, issued on Aug. 27, 1985; U.S. Pat. No. 4,446,241, issued on May 1, 1984; U.S. Pat. No. 4,356,135, issued to inventors Francois et al. on Oct. 26, 1982; U.S. Pat. No. 4,057,702, issued to inventor Lacombe-Allard on Nov. 8, 1977; and U.S. Pat. No. 4,004,935, issued to inventors Grosvenor et al. on Jan. 25, 1977.

Some examples of transfer sheets, printing media, methods of screen printing, and methods of transferring colors and decorations to substrates and materials related thereto that may be used or adapted for use in at least one possible embodiment of the present invention may be found in the following U.S. Pat. Nos. 5,976,674, issued to inventors Sugimoto et al. on Nov. 2, 1999; U.S. Pat. No. 5,973,588, issued to inventors Cowman et al. on Oct. 26, 1999; U.S. Pat. No. 5,953,203, issued to inventors Tormey et al. on Sep. 14, 1999; U.S. Pat. No. 5,935,358, issued to inventor Yamasaki on Aug. 10, 1999; U.S. Pat. No. 5,925,444, issued on Jul. 20, 1999; U.S. Pat. No. 5,925,160, issued on Jul. 20, 1999; U.S. Pat. No. 5,916,834, issued on Jun. 29, 1999; U.S. Pat. No. 5,891,520, issued to inventors Makar et al. on Apr. 6, 1999; U.S. Pat. No. 5,749,292, issued to inventors De Bastiani et al. on May 12, 1998; U.S. Pat. No. 5,410,957, issued to inventors Tanaka et al. on May 2, 1995; U.S. Pat. No. 5,202,162, issued to inventors Hart, Jr. et al. on Apr. 13, 1993; U.S. Pat. No. 5,154,121, issued to inventor Schneider on Oct. 13, 1992; U.S. Pat. No. 4,854,230, issued to inventors Niki et al. on Aug. 8, 1989; U.S. Pat. No. 4,549,484, issued to inventor Neese on Oct. 29, 1985; U.S. Pat. No. 4,306,012, issued to inventor Scheve on Dec. 15, 1981; and U.S. Pat. No. 3,990,364, issued to inventor Paans on Nov. 9, 1976.

Some examples of frits or fritting processes that may be used or adapted for use in at least one possible embodiment of the present invention may be found in the following U.S. Pat. Nos. 4,888,314, issued to inventors Bernier et al. on Dec. 19, 1989; U.S. Pat. No. 4,757,037, issued to inventors Colombet et al. on Jul. 12, 1988; U.S. Pat. No. 4,356,135, issued to inventors Francois et al. on Oct. 26, 1982; U.S. Pat. No. 4,057,702, issued to inventor Lacombe-Allard on Nov. 8, 1977; and U.S. Pat. No. 4,004,935, issued to inventors Grosvenor et al. on Jan. 25, 1977.

Some examples of defect detectors using ultraviolet and fluorescent radiation, spectrometers, and methods and materials related thereto, as well as similar apparatus using ultraviolet radiation, that may be used or adapted for use in at least one possible embodiment of the present invention may be found in the following U.S. Pat. Nos. 5,563,417, issued to inventors Gillard et al. on Oct. 8, 1996; U.S. Pat. No. 5,892,222, issued to inventor Elabd on Apr. 6, 1999; U.S. Pat. No. 5,565,983, issued to inventor Bamard on Oct. 15, 1996; U.S. Pat. No. 5,563,420, issued to inventors Sullivan et al. on Oct. 8, 1996; U.S. Pat. No. 5,512,758, issued to inventors Kobayashi et al. on Apr. 30, 1996; U.S. Pat. No. 5,493,123, issued to inventors Knollenberg et al. on Feb. 20, 1996; U.S. Pat. No. 5,491,344, issued to inventors Kenny et al on Feb. 13, 1996; U.S. Pat. No. 5,399,877, issued to inventors Carter et al. on Mar. 21, 1995; U.S. Pat. No. 5,296,703, issued to inventor Tsien on Mar. 22, 1994; U.S. Pat. No. 5,291,422, issued to inventor Esztergar on Mar. 1, 1994; U.S. Pat. No. 4,731,323, issued to inventors Cerami et al. on Mar. 15, 1988; U.S. Pat. No. 4,058,732, issued to inventor Wieder on Nov. 15, 1977; U.S. Pat. No. 4,000,422, issued to inventors Kuzmina et al. on Dec. 28, 1976; and U.S. Pat. No. 3,995,157, issued to inventors Holub et al. on Nov. 30, 1976.

Some examples of methods of mass spectrometry and proton and electron microscopy and apparatus related thereto, as well as similar methods and apparatus, that may be used or adapted for use in at least one possible embodiment of the present invention may be found in the following U.S. Pat. No. 5,869,833, issued to inventors Richardson et al. on Feb. 9, 1999; U.S. Pat. No. 5,852,294, issued to inventors Gulcicek et al. on Dec. 22, 1998; U.S. Pat. No. 5,773,078, issued to inventor Skelly on Jun. 30, 1998; U.S. Pat. No. 5,336,312, issued to inventors Byrne et al. on Aug. 9, 1994; U.S. Pat. No. 5,211,342, issued to inventors Hoy et al. on May 18, 1993; No.5,141,156, issued to inventors Hoy et al. on Aug. 25, 1992; U.S. Pat. No. 5,081,352, issued to inventors Makiae et al. on Jan. 14, 1992; U.S. Pat. No. 5,023,317, issued to inventor Adams on Jun. 11, 1991; U.S. Pat. No. 4,990,404, issued to inventor Adams on Feb. 5, 1991; U.S. Pat. No. 4,921,936, issued to inventor Adams on May 1, 1990; U.S. Pat. No. 4,867,947, issued to inventors Andresen et al. on Sep. 19, 1989; U.S. Pat. No. 4,621,232, issued to inventors Chang et al. on Nov. 4, 1986; U.S. Pat. No. 4,376,391, issued to inventor Brunnee on Mar. 15, 1983; and U.S. Pat. No. 3,940,616, issued to inventor Ball on Feb. 24, 1976.

Some examples of apparatus, procedures, and materials for nucleation, nucleating agents, and nucleation sites that may be used or adapted for use in at least one possible embodiment of the present invention may be found in the following U.S. Pat. Nos. 5,792,270, issued to inventor Saxena on Aug. 11, 1998; U.S. Pat. No. 5,591,682, issued to inventor Goto on Jan. 7, 1997; U.S. Pat. No. 5,486,495, issued to inventors Jewell et al. on Jan. 23, 1996; U.S. Pat. No. 5,512,520, issued to inventor Pfitzemaier on Apr. 30, 1996; U.S. Pat. No. 5,446,008, issued to inventors Krolla et al. on Aug. 29, 1995; and U.S. Pat. No. 5,173,453, issued to inventors Beall et al. on Dec. 22, 1992.

Some examples of processes, apparatus, procedures, or materials for melting raw materials to form glass, forming glass, cooling glass, crystallizing, ceraming, or ceramicization that may be used or adapted for use in at least one possible embodiment of the present invention may be found in the following U.S. Pat. Nos. 5,486,495, issued to inventors Jewell et al. on Jan. 23, 1996; U.S. Pat. No. 5,658,835, issued to inventors Onitani et al. on Aug. 19, 1997; U.S. Pat. No. 5,591,682, issued to inventor Goto on Jan. 7, 1997; U.S. Pat. No. 5,512,520, issued to inventor Pfitzenmaier on Apr. 30, 1996; U.S. Pat. No. 5,446,008, issued to inventors Krolla et al. on Aug. 29, 1995; U.S. Pat. No. 5,173,453, issued to inventors Beall et al. on Dec. 22, 1992; U.S. Pat. No. 5,010,041, issued to inventors Koyama et al. on Apr. 23, 1991; U.S. Pat. No. 4,536,203, issued to inventor Kramer on Aug. 20, 1985; U.S. Pat. No. 4,438,210, issued to inventor Rittler on Mar. 20, 1984; U.S. Pat. No. 4,360,567, issued to inventor Guillevic on Nov. 23, 1982; and U.S. Pat. No. 3,941,117, issued to inventors Pei et al. on Mar. 2, 1976.

Some examples of coloring additives, coloring components, or colorants and processes for their production that may be used or adapted for use in at least one possible embodiment of the present invention may be found in the following U.S. patent application and U.S. Pat. Nos.: U.S. patent application Ser. No. 09/364,479, entitled "Lead-Free and Cadmium-Free Glass Composition for Glazing, Enamelling and Decorating Glasses or Glass-Ceramics, and Process for the Production of a Glass-Ceramic Coated Therewith", filed on Jul. 30, 1999, having inventors Ina Mitra, Dr. Friedrich Siebers, Dr. Jutta Reichert, Dr. Cora Krause, Dr. Otmar Becker, and Dr. Michael Bug, and having assignee Schott Glas, which assignee has the address Hattenbergstraße 10, D-55122 Mainz, Federal Republic of Germany; and U.S. Pat. Nos. 5,512,520, issued to inventor Pfitzenmaier on Apr. 30, 1996; U.S. Pat. No. 5,256,602, issued to inventors Danielson et al. on Oct. 26, 1993; U.S. Pat. No. 5,446,008, issued to inventors Krolla et al. on Aug. 29, 1995; U.S. Pat. No. 5,250,112, issued to inventors Wussow et al. on Oct. 5, 1993; U.S. Pat. No. 5,010,041, issued to inventors Koyama et al. on Apr. 23, 1991; U.S. Pat. No. 4,698,100, issued to inventors Burow et al. on Oct. 6, 1987; U.S. Pat. No. 4,620,879, issued to inventors Burow et al. on Nov. 4, 1986; and U.S. Pat. No. 5,421,878, issued to inventors Lerch et al. on Jun. 6, 1995.

Some examples of white pigments commercially available from Bayer may be found in the following U.S. Pat. Nos. 4,249,953, issued on Feb. 10, 1981; U.S. Pat. No. 5,744,108, issued on Apr. 28, 1998; U.S. Pat. No. 5,250,112, issued on Oct. 5, 1993; U.S. Pat. No. 5,035,748, issued on Jul. 30, 1997; U.S. Pat. No. 4,193,907, issued on Mar. 18, 1980; and U.S. Pat. No. 3,971,741, issued on Jul. 27, 1976.

Some further examples of pigments, coloring agents, and coloring substances that may be used or adapted for use in at least one possible embodiment of the present invention may be found in the following U.S. Pat. Nos. 6,013,777, issued to inventors Hao et al. on Jan. 11, 2000; U.S. Pat. No. 6,013,776, issued to inventors Hao et al. on Jan. 11, 2000; U.S. Pat. No. 5,821,276, issued to inventor Duncan on Oct. 13, 1998; U.S. Pat. No. 5,569,539, issued to inventors Avar et al. on Oct. 29, 1996; U.S. Pat. No. 4,548,609, issued to inventor Schone on Oct. 22, 1985; U.S. Pat. No. 4,458,003, issued to inventors Shepherd et al. on Jul. 3, 1984; and U.S. Pat. No. 4,250,382, issued to inventor Libby on Feb. 10, 1981.

U.S. Patent Application Ser. No. 09/364,479, entitled "Lead-Free and Cadmium-Free Glass Composition for Glazing, Enamelling and Decorating Glasses or Glass-Ceramics, and Process for the Production of a Glass-Ceramic Coated Therewith", filed on Jul. 30, 1999, having inventors Ina Mitra, Dr. Friedrich Siebers, Dr. Jutta Reichert, Dr. Cora Krause, Dr. Otmar Becker, and Dr. Michael Bug, and having assignee Schott Glas, which assignee has the address Hattenbergstraße 10, D-55122 Mainz, Federal Republic of Germany; and the corresponding foreign patent applications, namely, Federal Republic of Germany Patent Application No. 198.34 801.0-45, filed on Aug. 1, 1998, entitled "Blei- und cadmiumfreie Glaszusammensetzung zum Glasieren, Emailieren und Dekorieren von Gläisem oder Glaskeramiken sowie Verfahren zur Herstellung einer damit beschichteten Glaskeramik", having inventors Dr. Ina Mitra, Dr. Friedrich Siebers, Dr. Jutta Reichert, Dr. Cora Krause, Dr. Otmar Becker, and Dr. Michael Bug, and having assignee Schott Glas, which assignee has the address Hattenbergstraße 10, D-55122 Mainz, Federal Republic of Germany; and DE-OS 198 34 801.0-45 and DE-PS 198 34 801.0-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Throughout the specification and claims to U.S. patent application Ser. No. 09/364,479, described above and incorporated by reference herein, the term "mean" is more preferably stated as the term "average".

The following patents, patent applications, and patent publications, cited in the German office action dated Dec. 28, 1999, are hereby incorporated by reference as if set forth in their entirety herein: DE-OS 44 22 338 A1, filed on Jun. 27, 1994, laid open on Jan. 4, 1996, having the inventors Thomas Morgeneyer and Wolfgang Richter, and having the applicant Henkel KGaA, Federal Republic of Germany; DE-OS 40 24 871 A1, filed on Aug. 6, 1990, laid open on Feb. 13, 1992, having the inventors Manfred Walter, Karl-Heinz Wassmer, and Maria Lorenz, and having the applicant BASF AG, Federal Republic of Germany; DE-PS 35 05 922 C1, filed on Feb. 21, 1985, issued on Oct. 23, 1986, and having the owner Schott Glaswerke, 6500 Mainz, Federal Republic of Germany; and DE-PS 197 28 881 C1, filed Jul. 7, 1997, issued Sep. 10, 1998, having the inventors Susanne Rapp and Holger Sieck, and having the owner Schott Glaswerke, 55122 Mainz, Federal Republic of Germany.

In addition, throughout the specification and claims to U.S. patent application Ser. No. 09/364,479, described above and incorporated by reference herein, the term "in % by weight", "in percent by weight", or "in weight percent" is more preferably stated as the term "by weight percent, based on the total weight of the composition".

An essentially full description of the CIELAB system may be found in the following CIE (Commission Internationale de l'Eclairage, or International Commission on Illumination) publications: CIE Publication No. 15.2–1986, entitled "Colorimetry, 2nd Edition" and Supplement No. 2 to CIE Publication No. 15 ((E-1.3.1)1971)/(TC-1.3) 1978. These CIE publications may be available from the CIE National Committee of USA, Mr. Thomas Lemons, TLA - Lighting Consultants Inc., 7 Pond Street, Salem, Mass. 01970 or from The CIE Central Bureau, Kegelgasse 27, A-1030 Vienna, Austria.

Some further examples of descriptions of the CIELAB system or the L*a*b* system, the CIE system, the Standard Valence System defined in DIN 5033, and other color systems and chromaticity systems and methods and apparatus for measurement related thereto may be found in the following U.S. Pat. Nos. and other publications: U.S. Pat. No. 5,994,249, issued to inventors Graber et al. on Nov. 30, 1999; U.S. Pat. No. 5,958,126, issued to inventors Adel et al. on Sep. 28, 1999; U.S. Pat. No. 5,754,448, issued to inventors Edge et al. on May 19, 1998; U.S. Pat. No. 5,512,520, issued to inventor Pfitzenmaier on Apr. 30, 1996; U.S. Pat. No. 4,698,100, issued to inventors Burow et al. on Oct. 6, 1987; U.S. Pat. No. 4,620,879, issued to inventors Burow et al. on Nov. 4, 1986; U.S. Pat. No. 4,546,045, issued to inventor Elias on Oct. 8, 1985; U.S. Pat. No. 4,448,608, issued to inventors Jenkins et al. on May 15, 1984; U.S. Pat. No. 4,404,254, issued to inventors Franz et al. on Sep. 13, 1983; U.S. Pat. No. 4,394,470, issued to inventors Werner et al. on Jul. 19, 1983; U.S. Pat. No. 4,378,252, issued to inventors Kiemle et al. on Mar. 29, 1983; U.S. Pat. No. 4,370,270, issued to inventors Bock et al. on Jan. 25, 1983; U.S. Pat. No. 4,363,888, issued to inventors Willison et al. on Dec. 14, 1982; U.S. Pat. No. 4,067,850, issued to inventors Kohler et al. on Jan. 10, 1978; and the book entitled Coloring of plastics, having the editor T. G. Webber, published by Wiley-Interscience of New York in 1979; and Ulimann's "Enzykiopedie der technischen Chemie", 4th edition, Vol. 18, Weinheim 1979.

Some examples of stoves, stove windows, display windows, display panels, control panels, utensils, cooking hobs or apparatus, microwave ovens, or base plates for microwave ovens that may be used or adapted for use in at least one possible embodiment of the present invention may be found in the following U.S. Pat. Nos. 5,679,273, issued on Oct. 21, 1997; U.S. Pat. No. 5,406,932, issued on Apr. 18, 1995; U.S. Pat. No. 5,422,460, issued on Jun. 6, 1995; U.S. Pat. No. 5,424,512, issued on Jun. 13, 1995; U.S. Pat. No. 5,425,353, issued on Jun. 20, 1995; U.S. Pat. No. 5,429,114, issued on Jul. 4, 1995; U.S. Pat. No. 5,448,036, issued on Sep. 5, 1995; U.S. Pat. No. 5,213,091, issued on May 25, 1993; U.S. Pat. No. D336,210, issued on Jun. 8, 1993; U.S. Pat. No. 5,280,152, issued on Jan. 18, 1994; U.S. Pat. No. 5,400,765, issued on Mar. 28, 1995; U.S. Pat. No. 5,437,262, issued on Aug. 1, 1995; U.S. Pat. No. 4,997,302, issued to inventors Merigaud et al. on Dec. 11, 1990; U.S. Pat. No. 4,597,374, issued to inventor Igarashi on Jul. 1, 1986; U.S. Pat. No. 4,438,210, issued to inventor Rittler on Mar. 20, 1984; U.S. Pat. No. 4,360,567, issued to inventor Guillevic on Nov. 23, 1982; U.S. Pat. No. 4,351,998, issued to inventors Keppel et al. on Sep. 28, 1982; U.S. Pat. No. 4,320,275, issued to inventor Reiss on Mar. 16, 1982; U.S. Pat. No. 4,163,141, issued to inventors Tanaka et al. on Jul. 31, 1979; and U.S. Pat. No. 3,941,117, issued to inventors Pei et al. on Mar. 2, 1976.

Some examples of methods or apparatus for X-ray diffraction measurement and X-ray diffractometry that may be used or adapted for use in at least one possible embodiment of the present invention may be found in the following U.S. Pat. Nos. 5,663,327, issued to inventors Tambo et al. on Sep. 2, 1997; U.S. Pat. No. 5,416,207, issued to inventors Imai et al. on May 16, 1995; U.S. Pat. No. 4,770,593, issued to inventor Anderson on Sep. 13, 1988; U.S. Pat. No. 4,658,411, issued to inventors Argoud et al. on Apr. 14, 1987; and U.S. Pat. No. 4,644,761, issued to inventors Chatzipetros et al. on Feb. 24, 1987.

U.S. patent application Ser. No. 09/507,315, filed Feb. 18, 2000, having Attorney Docket No. NHL-SCT-11 US, entitled "Translucent or Opaque Glass-Ceramic Containing β-Quartz Solid Solution as the Predominant Crystal Phase, and the Use Thereof," and its corresponding foreign patent applications and patent publications, namely, Federal Republic of Germany Patent Application No. 199 07 038.5, filed on Feb. 19, 1999, entitled "Transluzente oder opake Glaskeramik mit Hochquarz-Mischkristallen als vorherrschender Kristallphase und deren Verwendung", having inventors Dipl.-Ing. Ina Mitra, Dr. Friedrich Siebers, Dipl.-Geol. Klaus Schönberger, Dr. Bernd Rüdinger and Dipl.-Phys. Bernd Schultheis, and having assignee Schott Glas, which assignee has the address Hattenbergstraße 10, D-55 122 Mainz, Federal Republic of Germany, and DE-OS 199 07 038.5 and DE-PS 199 07 038.5, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The components disclosed in the various publications, disclosed or incorporated by reference herein, may be used in the embodiments of the present invention, as well as equivalents thereof.

The drawings are incorporated in their entirety by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 199 12 914.2, filed on Mar. 22, 1999, having inventors Dipl.-Ing. Monica Cotlear de Witzmann, Dr. Petra Auchter-Krummel, Dr. Waldemar Weinberg, and Dave Campbell, and DE-OS 199 12 914.2 and DE-PS 199 12 914.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at Applicants' option, into the claims during prosecution as further limitations in the claims to patentably distinguish any amended claims from any applied art.

The invention as described hereinabove in the context of the preferred embodiments is not to be taken as limited to all of the provided details thereof, since modifications and variations thereof may be made without departing from the spirit and scope of the invention.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A method for producing substrates having fired patterns thereon having an essentially defect-free visual appearance, which substrates comprise glass, glass-ceramic, or ceramic, said method comprising the steps of:

mixing components to form a mixture for at least one pattern to be fired on said substrates;

said components comprising at least one vitreous substance, at least one pigment, and at least one contrasting agent;

said at least one pigment comprising at least one metal oxide;

said at least one contrasting agent in said mixture being capable of emitting radiation upon exposure to a predetermined range of irradiation comprising ultraviolet irradiation;

applying said at least one pattern to said substrates with said mixture to provide said at least one pattern with at least one background;

said mixture comprising sufficient amounts of said at least one contrasting agent to provide a sufficiently high contrast with said at least one background to permit detection of predetermined defects in said at least one pattern after said step of applying and before firing said at least one applied pattern;

irradiating said substrates and their at least one applied pattern, after said step of applying, with radiation in said predetermined range of irradiation;

at least one of said substrates comprising at least one defective pattern, said defective pattern having predetermined defects;

detecting said predetermined defects in said at least one defective pattern against said at least one background upon said step of irradiating;

at least one of said substrates comprising at least one non-defective pattern, said at least one non-defective pattern being free from said predetermined defects;

rejecting said at least one defective pattern and passing said at least one non-defective pattern; and firing said at least one non-defective pattern on said substrates to produce substrates having fired patterns thereon.

2. The method according to claim 1, wherein said at least one contrasting agent comprises at least one thiophene-benzoxazol derivative.

3. The method according to claim 2, wherein:

said at least one contrasting agent comprises at least one contrasting agent in finely divided form; and said mixture, before said step of firing, comprises said at least one contrasting agent in an amount within the range of approximately 0.05 percent by weight, based on the total weight of said mixture, to approximately 10 percent by weight, based on the total weight of said mixture.

4. The method according to claim 2, wherein:

said at least one contrasting agent comprises at least one contrasting agent in finely divided form; and said mixture, before said step of firing, comprises said at least one contrasting agent in an amount within the range of approximately 0.1 percent by weight, based on the total weight of said mixture, to approximately 1 percent by weight, based on the total weight of said mixture.

5. The method according to claim 2, wherein said at least one contrasting agent comprises 2,2'-(2,5-thiophenediyl)-bis (3-(1,1-dimethylethyl))-benzoxazol.

6. The method according to claim 5, wherein:

said at least one contrasting agent comprises at least one contrasting agent in a finely divided form; and said mixture, before said step of firing, comprises said at least one contrasting agent in an amount within the range of approximately 0.05 percent by weight, based on the total weight of said mixture, to approximately 10 percent by weight, based on the total weight of said mixture.

7. The method according to claim 5, wherein:

said at least one contrasting agent comprises at least one contrasting agent in a finely divided form; and said mixture, before said step of firing, comprises said at least one contrasting agent in an amount within the range of approximately 0.1 percent by weight, based on the total weight of said mixture, to approximately 1 percent by weight, based on the total weight of said mixture.

8. The method according to claim 5, wherein:

said at least one pigment is in the form of a powder; and said powder has an average particle diameter of approximately 1 micrometer up to approximately 40 micrometers.

9. The method according to claim 8, wherein said mixture comprises at least one pigment capable of being used for screen printing.

10. The method according to claim 2, wherein:

said at least one pigment is in the form of a powder; and said powder has an average particle diameter of approximately 1 micrometer up to approximately 40 micrometers.

11. The method according to claim 10, wherein:

said substrate comprises a glass, said glass comprising a composition of the following components in percent by weight, based on the total weight of said composition:

| Component | Weight Percent |
| --- | --- |
| $SiO_2$ | approximately 54.0 |
| $A_2O_3$ | approximately 17.5 |
| $B_2O_3$ | approximately 17.5 |
| $Li_2O$ | approximately 3.1 |
| $TiO_2$ | approximately 1.9 |
| ZnO | approximately 1.4 |
| $ZrO_2$ | approximately 1.2 |
| $Na_2O$ | approximately 1.0 |
| $K_2O$ | approximately 1.0 |

-continued

| Component | Weight Percent |
|---|---|
| SrO | approximately 1.0 |
| MgO | approximately 0.4 |
| | 100% | said mixture comprises said at least one pigment in an amount up to 20 percent by weight, based on the total weight of said mixture;

said powder has an average particle diameter of approximately 1 micrometer to approximately 3 micrometers; and said step of mixing comprises mixing said at least one vitreous substance, said at least one pigment, said at least one contrasting agent, and at least one screen printing oil.

12. The method according to claim 10, wherein said mixture comprises at least one pigment capable of being used for screen printing.

13. The method according to claim 12, wherein said method comprises the additional steps of:

removing said at least one defective pattern from said substrates;

applying said at least one non-defective pattern to said substrates; and inspecting said at least one non-defective pattern, after said step of applying said at least one non-defective pattern to 'said substrates, for predetermined defects by irradiating said substrates with radiation in said predetermined range of irradiation.

14. A method for producing substrates having fired patterns thereon having an essentially defect-free visual appearance, which substrates comprise glass, glass-ceramic, or ceramic, said method comprising the steps of:

mixing components to form a mixture for at least one pattern to be fired on said substrates;

said components comprising at least one pigment and at least one additive;

said at least one additive in said mixture being capable of emitting radiation upon exposure to a predetermined range of irradiation comprising ultraviolet irradiation;

applying said at least one pattern to said substrates with said mixture to provide said at least one pattern with at least one background;

said mixture comprising sufficient amounts of said at least one additive to provide a sufficiently high contrast with said at least one background to permit detection of predetermined defects in said at least one pattern after said step of applying and before firing said at least one pattern;

irradiating said substrates and their at least one pattern, after said step of applying, with radiation in said predetermined range of irradiation;

at least one of said substrates comprising at least one defective pattern, said defective pattern having predetermined defects;

detecting said predetermined defects in said at least one defective pattern against said at least one background upon said step of irradiating;

at least one of said substrates comprising at least one non-defective pattern, said at least one non-defective pattern being free from said predetermined defects;

rejecting said at least one defective pattern and passing said at least one non-defective pattern; and firing said at least one non-defective pattern on said substrates to produce substrates having fired patterns thereon.

15. The method according to claim 14, wherein:

said at least one additive comprises at least one thiophene-benzoxazol derivative;

said at least one additive comprises at least one additive in a finely divided form;

said at least one mixture, before said step of firing, comprises said at least one additive in an amount within the range of approximately 0.5 percent by weight, based on the total weight of said mixture, to approximately 10 percent by weight, based on the total weight of said mixture;

said at least one pigment is in the form of a powder; and said powder has an average particle diameter of approximately 1 micrometer up to approximately 40 micrometers.

16. The method according to claim 15, wherein:

said at least one additive comprises 2,2'-(2,5-thiophenediyl)-bis(3-(1,1-dimethylethyl))-benzoxazol; and said mixture comprises at least one pigment capable of being used for screen printing;

and said method comprises the additional steps of:

removing said at least one defective pattern from said substrates;

applying said at least one non-defective pattern to said substrates; and inspecting said at least one non-defective pattern on said substrates for predetermined defects by irradiating said substrates with radiation in said predetermined range of irradiation.

17. A method for producing substrates having fired patterns thereon having an essentially defect-free visual appearance, which substrates comprise glass, glass-ceramic, or ceramic, said method comprising the steps of:

forming at least one pattern from a substance to be fired on said substrates;

said substance being capable of emitting radiation upon exposure to a predetermined range of irradiation comprising ultraviolet irradiation;

applying said at least one pattern with said substance to said substrates to provide said at least one pattern with at least one background;

said substance being present in a sufficiently high amount to provide a sufficiently high contrast with said at least one background to permit detection of predetermined defects in said at least one pattern after said step of applying and before firing said at least one applied pattern;

irradiating said substrates and their at least one pattern, after said step of applying, with radiation in said predetermined range of irradiation;

at least one of said substrates comprising at least one defective pattern, said defective pattern having predetermined defects;

detecting said predetermined defects in said at least one defective pattern against said at least one background upon said step of irradiating;

at least one of said substrates comprising at least one non-defective pattern, said at least one non-defective pattern being free from said predetermined defects;

rejecting said at least one defective pattern and passing said at least one non-defective pattern; and firing said at least one non-defective pattern on said substrates to produce substrates having fired patterns thereon.

18. The method according to claim 17, wherein:

said substance comprises at least one thiophene-benzoxazol derivative;

said substance comprises at least one substance in a finely divided form;

said pattern, before said step of firing, comprises said substance in an amount within the range of approximately 0.5 percent by weight, based on the total weight of said pattern, to approximately 10 percent by weight, based on the total weight of said pattern;

said substance comprises 2,2'-(2,5-thiophenediyl)-bis(3-(1,1-dimethylethyl))-benzoxazol;

said pattern comprises at least one pigment in the form of a powder;

said powder has an average particle diameter of approximately 1 micrometer up to approximately 40 micrometers; and said pattern comprises at least one pigment capable of being used for screen printing;

and said method comprises the additional steps of:

removing said at least one defective pattern from said substrates;

applying said at least one non-defective pattern to said substrates; and inspecting said at least one non-defective pattern on said substrates for predetermined defects by irradiating said substrates with radiation in said predetermined range of irradiation.

* * * * *

UNITED STATES PATENT AND TRADEMARK OFFICE
CERTIFICATE OF CORRECTION

PATENT NO.    : 6,524,641 B1                                               Page 1 of 1
DATED         : February 25, 2003
INVENTOR(S)   : Monica Cotlear de Witzmann et al.

It is certified that error appears in the above-identified patent and that said Letters Patent is hereby corrected as shown below:

Column 2,
Line 28, before "off", delete "bum" and insert -- burn --.

Column 4,
Line 55, after "conditions" delete ",".
Line 64, after "CIBA", delete "Spezialitäiten" and insert -- Spezialitäten --.

Column 8,
Line 58, after "inventors", delete "Makiae" and insert -- Maklae --.

Column 10,
Line 23, after "von", delete "Gläisem" and insert -- Gläsern --.

Column 15,
Line 31, after "to", delete "'said" and insert -- said --.

Signed and Sealed this

Twenty-fourth Day of June, 2003

JAMES E. ROGAN
*Director of the United States Patent and Trademark Office*